United States Patent
Noguchi

(10) Patent No.: US 7,598,875 B2
(45) Date of Patent: Oct. 6, 2009

(54) RFID TAG-READING NOTIFICATION APPARATUS, CONTROL METHOD THEREFOR, AND PROGRAM FOR IMPLEMENTING THE CONTROL METHOD

(75) Inventor: Akane Noguchi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 615 days.

(21) Appl. No.: 11/259,907

(22) Filed: Oct. 27, 2005

(65) Prior Publication Data

US 2007/0095914 A1   May 3, 2007

(30) Foreign Application Priority Data

Oct. 27, 2004   (JP)   ............................. 2004-312419

(51) Int. Cl.
   *G08B 13/14*   (2006.01)
(52) U.S. Cl. .................. 340/572.8; 340/572.1; 235/375
(58) Field of Classification Search ............. 340/572.8, 340/572.1, 10.2, 539.32, 539.11, 539.23, 340/686.1, 825.49; 235/375, 383, 245, 380
   See application file for complete search history.

(56) References Cited

U.S. PATENT DOCUMENTS

| | | | | |
|---|---|---|---|---|
| 6,269,342 | B1 * | 7/2001 | Brick et al. ................... | 705/20 |
| 6,318,636 | B1 * | 11/2001 | Reynolds et al. ........ | 235/472.01 |
| 7,221,900 | B2 * | 5/2007 | Reade et al. ................... | 455/1 |
| 7,229,023 | B2 * | 6/2007 | Raskar ....................... | 235/492 |
| 7,336,186 | B2 * | 2/2008 | Noguchi .................. | 340/572.8 |

\* cited by examiner

*Primary Examiner*—Anh V La
(74) *Attorney, Agent, or Firm*—Pillsbury Winthrop Shaw Pittman LLP

(57) ABSTRACT

An RFID tag-reading notification apparatus which is capable of alerting a user by notifying the user that information has been or is going to be read from an RFID tag by a third party, without tailoring the RFID tag. A receiver section receives one of radio waves generated by an RFID reader and a signal transmitted from at least one RFID tag having received the radio waves. When the receiver section receives at least one of the radio waves and the signal, the notification apparatus outputs a notification signal indicative of reading of information from the RFID tag by the RFID reader.

6 Claims, 9 Drawing Sheets

FIG. 3

| RFID TAG | NOTIFICATION INSTRUCTION |
|---|---|
| INFORMATION ON RFID TAG 3a | × |
| INFORMATION ON RFID TAG 4a | ○ |
| INFORMATION ON RFID TAG 5a | ○ |
| INFORMATION ON RFID TAG 6a | × |
| ..... | ..... |
| ..... | ..... |
| ..... | ..... |

TBL

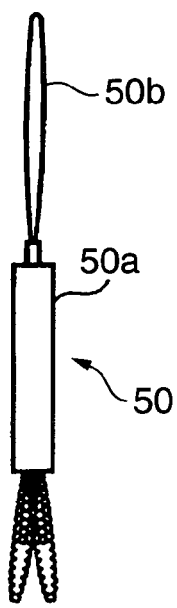
FIG. 9
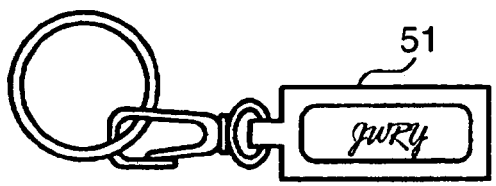
FIG. 10
FIG. 11
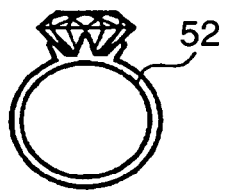
FIG. 12
FIG. 13
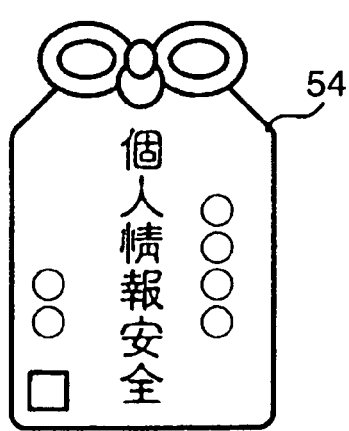
FIG. 14
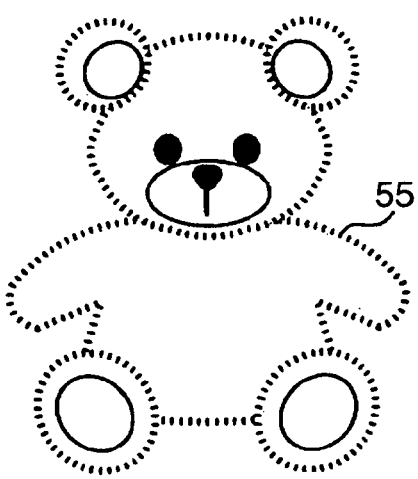

RFID TAG-READING NOTIFICATION APPARATUS, CONTROL METHOD THEREFOR, AND PROGRAM FOR IMPLEMENTING THE CONTROL METHOD

BACKGROUND OF THE INVENTION

1. Field of the Invention

The present invention relates to an RFID (Radio Frequency Identification) tag-reading notification apparatus, a control method therefor, and a program for implementing the control method, and more particularly to an RFID tag-reading notification apparatus which is capable of alerting a user by notifying the user that RFID tag information has been or is going to be read by a third party, a control method therefor, and a program for implementing the control method.

2. Description of the Related Art

Recently, an RFID tag, which is also called a wireless IC tag, is widely used in sales management, inventory management, or distribution management. In general, the RFID tag is comprised of a small-sized IC chip for recording information, and a metal antenna. Most of such IC chips have a size of 0.1 to several square millimeters. A unique ID can be assigned to each IC chip, and data can be collectively read and written from and into a plurality of RFID tags from a location at some distance.

Many RFID tags are provided with a memory, a logic circuit, and a coil, and permit data reading and writing from and into the same via radio communication. The logic circuit can perform processing such as calculation, authentication, and encipherment. A device that performs data reading and writing from RFID tags is called a reader/writer, and is generally capable of performing communications from a location at a distance of several centimeters to several meters.

Some RFID tags do not have a battery incorporated therein. Such RFID tags without a built-in battery are supplied with power by receiving electric waves from a reader. On the other hand, RFID tags which are provided with a built-in battery can actively transmit information.

As mentioned above, RFID tags are used for various applications, and it is expected that the range of applications thereof will further expand in the future. However, when an RFID tag is attached to an article which the user is carrying with him/her, there is a fear that a malicious third party might read information stored in the RFID tag. In such an event, the information can be used for undesirable purposes. For this reason, the development of a device is desired which can prevent unintended reading of such information by a third party.

An RFID label (RFID tag) disclosed e.g. in Japanese Laid-Open Patent Publication (Kokai) No. 2003-123040 is provided with permission (authentication) means for determining whether or not reading of information therefrom should be permitted, so as to allow reading of only information approved by the permission means.

However, in the RFID label, i.e. the RFID tag disclosed in Japanese Laid-Open Patent Publication (Kokai) No. 2003-123040, since the permission means is provided in the RFID tag itself, the RFID tag inevitably becomes larger in size and more expensive. Further, general-purpose RFID tags without the permission means are incapable of alerting the user to leakage of data.

SUMMARY OF THE INVENTION

It is a first object of the present invention to provide an RFID tag-reading notification apparatus which is capable of alerting a user by notifying the user that information has been or is going to be read from an RFID tag by a third party, without tailoring the RFID tag, a control method for the RFID tag-reading notification apparatus, and a program for implementing the control method.

It is a second object of the present invention to provide an RFID tag-reading notification apparatus which can dispense with provision of permission means in the RFID tag, to thereby permit the RFID tag to be made compact in size and low in cost.

To attain the above objects, in a first aspect of the present invention, there is provided an RFID tag-reading notification apparatus comprising a receiving device that receives at least one of radio waves generated by an RFID reader and a signal transmitted from at least one RFID tag having received the radio waves, and a notification signal output device that is operable when the receiving device receives at least one of the radio waves and the signal, to output a notification signal indicative of reading of information from the RFID tag by the RFID reader.

Preferably, the RFID tag-reading notification apparatus further comprises an alarm device that performs at least one of sound generation, light emission, and vibration based on the notification signal output from the notification signal output device.

Preferably, the RFID tag-reading notification apparatus comprises a flexible sheet having a surface attachable to an article, and the receiving device and the notification signal output device are attached to the sheet.

Preferably, the RFID tag-reading notification apparatus comprises a body to which the receiving device and the notification signal output device are attached.

More preferably, the receiving device, the notification signal output device, and the alarm device are accommodated in a portable case, and the case is removably attached to an article or a human body by attaching means.

To attain the above objects, in a second aspect of the present invention, there is provided an RFID tag-reading notification apparatus comprising a receiving device that receives a signal transmitted from at least one RFID tag having received radio waves from an RFID reader, a storage device that stores information stored in at least one predetermined RFID tag, and a notification signal-outputting device that is operable when information contained in the signal received by the receiving device agrees with the information stored in the storage device, to output a notification signal indicative of reading of information from the predetermined RFID tag by the RFID reader.

Preferably, the storage device stores the information stored in the predetermined RFID tag and notification-instructing information indicative of whether or not the notification signal is to be output, and the notification signal-outputting device outputs the notification signal when the information received by the receiving device agrees with the information stored in the storage device and at a same time, the notification-instructing information indicates that the notification signal is to be output.

Preferably, the RFID tag-reading notification apparatus further comprises an alarm device that performs at least one of sound generation, light emission, and vibration based on the notification signal output from the notification signal-outputting device.

More preferably, the receiving device, the storage device, the notification signal output device, and the alarm device are accommodated in a portable case, and the case is removably attached to an article or a human body by attaching means.

To attain the above objects, in a third aspect of the present invention, there is provided a control method for an RFID tag-reading notification apparatus having a receiving device that receives at least one of radio waves generated by an RFID reader and a signal transmitted from at least one RFID tag having received the radio waves, and a notification signal-outputting device that outputs a notification signal indicative of reading of information from the RFID tag by the RFID reader, comprising a determining step of determining whether or not the radio waves or at least one of the one or more signals has been received by the receiving device, and an output step of outputting the notification signal from the notification signal-outputting device when it is determined in the determining step that at least one of the radio waves and the signal have or has been received by the receiving device.

To attain the above objects, in a fourth aspect of the present invention, there is provided a control method for an RFID tag-reading notification apparatus having a receiving device that receives a signal transmitted from at least one RFID tag having received radio waves from an RFID reader, a storage device that stores information stored in at least one predetermined RFID tag, and a notification signal-outputting device that outputs a notification signal indicative of reading of information from the predetermined RFID tag by the RFID reader, comprising a determining step of determining whether or not information contained in the signal received by the receiving device agrees with the information stored in the storage device, and an output step of outputting the notification signal from the notification signal-outputting device when it is determined in the determining step that the information contained in the signal received by the receiving device agrees with the information stored in the storage device.

To attain the above objects, in a fifth aspect of the present invention, there is provided a program for causing a computer to execute a control method for an RFID tag-reading notification apparatus having a receiving device that receives at least one of radio waves generated by an RFID reader and a signal transmitted from at least one RFID tag having received the radio waves, and a notification signal-outputting device that outputs a notification signal indicative of reading of information from the RFID tag by the RFID reader, comprising a determining module for determining whether or not the radio waves or at least one of the one or more signals has been received by the receiving device, and an output module for outputting the notification signal from the notification signal-outputting device when it is determined by the determining module that at least one of the radio waves and the signal have or has been received by the receiving device.

To attain the above objects, in a sixth aspect of the present invention, there is provided a program for causing a computer to execute a control method for an RFID tag-reading notification apparatus having a receiving device that receives a signal transmitted from at least one RFID tag having received radio waves from an RFID reader, a storage device that stores information stored in at least one predetermined RFID tag, and a notification signal-outputting device that outputs a notification signal indicative of reading of information from the predetermined RFID tag by the RFID reader, comprising a determining module for determining whether or not information contained in the signal received by the receiving device agrees with the information stored in the storage device, and an output module for outputting the notification signal from the notification signal-outputting device when it is determined by the determining module that the information contained in the signal received by the receiving device agrees with the information stored in the storage device.

With the configuration of the present invention, it is possible to detect that information stored in an RFID tag which the user is carrying has been or is going to be read, thereby enabling the user to be on the alert for reading of the information by a malicious third party. Further, since the permission means is not provided in the RFID tag, the RFID tag can be made compact in size and low in cost.

The above and other objects, features, and advantages of the invention will become more apparent from the following detailed description taken in conjunction with the accompanying drawings.

BRIEF DESCRIPTION OF THE DRAWINGS

FIG. 3 is a diagram showing a table of contents stored in respective RFID tags appearing in FIG. 1 and information indicative of whether notification is to be carried out;

FIG. 9 is a schematic front view of a strap-type notification apparatus according to a variation of the present invention;

FIG. 10 is a schematic front view of a key holder-type notification apparatus according to another variation of the present invention;

FIG. 11 is a schematic front view of a ring provided integrally with a notification apparatus according to a variation of the present invention;

FIG. 12 is a schematic front view of a watch provided integrally with a notification apparatus according to a variation of the present invention;

FIG. 13 is a schematic front view of a notification apparatus according to a variation of the present invention in the form of a lucky charm;

FIG. 14 is a schematic front view of a notification apparatus according to a variation of the present invention in the form of a mascot;

DETAILED DESCRIPTION OF THE PREFERRED EMBODIMENTS

The present invention will now be described in detail below with reference to the drawings showing preferred embodiments thereof.

First, a first embodiment of the present invention will be described with reference to FIGS. 1 to 3.

Figure 1:
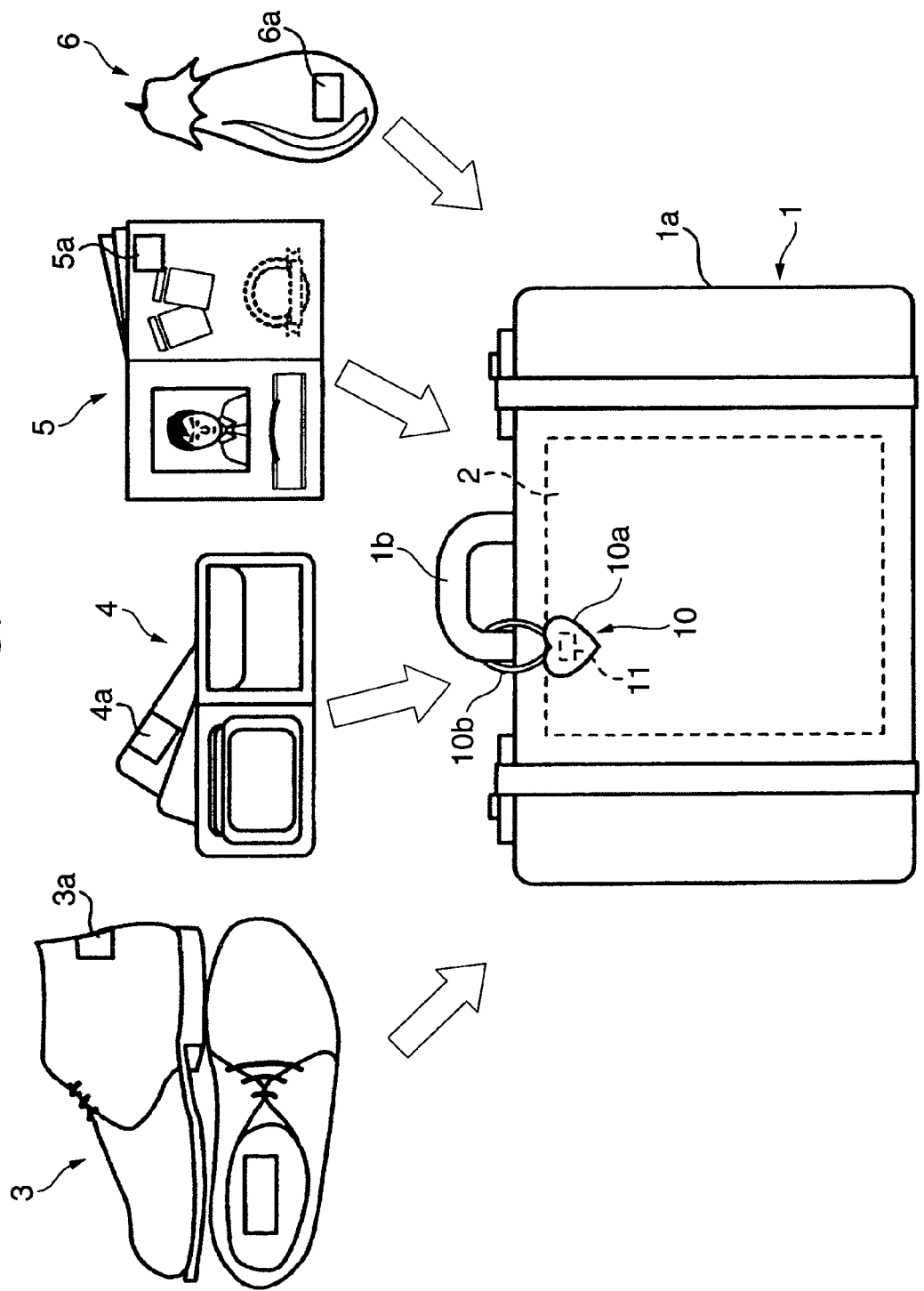
FIG. 1 is a schematic view showing the appearance of a suitcase as a portable container equipped with an RFID tag-reading notification apparatus according to a first embodiment of the present invention, and various articles contained in the suitcase and each having an RFID tag attached thereto.

FIG. 1 is a schematic view showing the appearance of a suitcase as a portable container equipped with an RFID tag-reading notification apparatus according to the first embodiment of the present invention, and various articles contained in the suitcase and each having an RFID tag attached thereto. FIG. 2 is a block diagram showing the circuit configuration of a control section provided in the notification apparatus in FIG. 1, and FIG. 3 is a diagram showing a table of contents stored in respective RFID tags appearing in FIG. 1 and information indicative of whether notification is to be carried out.

As shown in FIG. 1, the suitcase 1 is comprised of two suitcase body halves e.g. hinged to each other such that they can be opened and closed, and a handle 1b attached to one 1a of the suitcase body halves so that a user can carry the suitcase 1. The suitcase 1 has formed therein a container section 2 that can contain various articles, such as shoes 3, a wallet 4, a passport 5, and a vegetable 6. RFID tags 3a to 6a are attached to the shoes 3, the wallet 4, the passport 5, and the vegetable 6, respectively.

The suitcase 1 has the RFID tag-reading notification apparatus 10, which is e.g. of a key holder-type, attached thereto. This notification apparatus 10 is comprised of a portable body 10a, and a key holder-type mounting section 10b. This type of notification apparatus 10 can be removed from the suitcase 1 and mounted onto another article (such as a bag). The control section 11 is provided in the notification apparatus 10.

Figure 2:
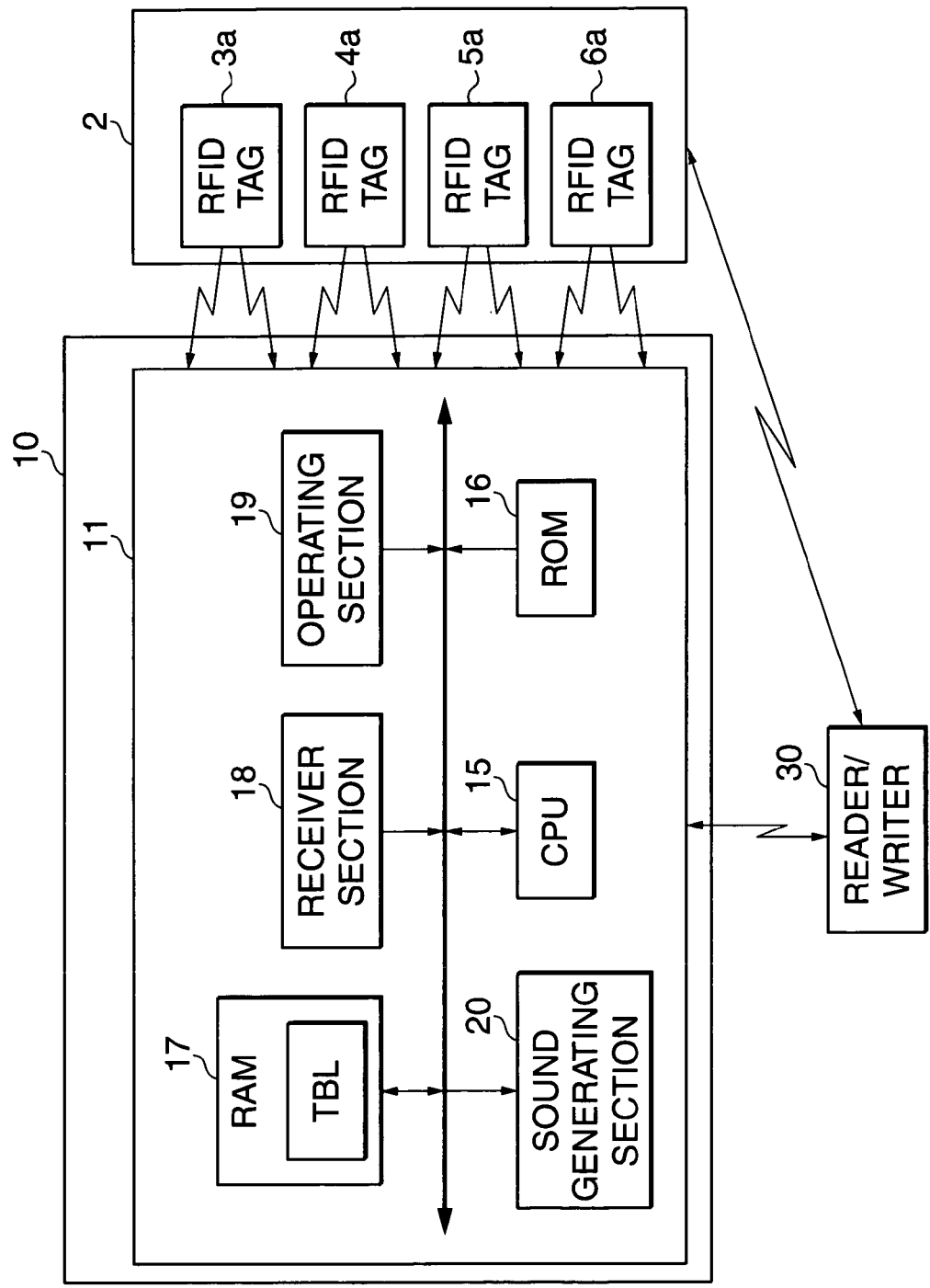
FIG. 2 is a block diagram showing the circuit configuration of a control section provided in the notification apparatus in FIG. 1.

In FIG. 2, reference numeral 15 designates a CPU that controls the components of the control section 11. The CPU 15 operates on a program stored in a ROM 16. Reference numeral 17 designates a RAM used as a work area for the CPU 15, and the RAM 17 has a non-volatile area in which the table TBL (see FIG. 3), described in detail hereinafter, is stored. Reference numeral 18 designates a receiver section that reads information transmitted from the RFID tags. The information read by the receiver section 18 is supplied to the CPU 15.

The receiver section 18 is configured to generate electric power from external radio waves. More specifically, the receiver section 18 is comprised of a coil antenna, a capacitor that cooperates with the coil antenna to form a resonance circuit, and a power generator section that obtains power from induced current which is generated by electromagnetic induction with external radio waves to flow to the resonance circuit. The power obtained by the power generator section is supplied to the components of the control section 11. It is also possible to provide a connection terminal in the control section 11 so as to supply power to the control section 11 from an external power supply, or alternatively to contain a battery in the notification apparatus 10 so as to supply power to the control section 11 from the battery.

Further, the receiver section 18 has a function of outputting a reading signal to the RFID tags to supply power to them. The receiver section 18 is capable of switching on and off the output of the reading signal for the reading of the RFID tags, under the control of the CPU 15 operating in response to operation of an operating section 19 by the user. When the output of the reading signal is OFF, the receiver section 18 is incapable of supplying power to the RFID tags, but when a RFID tag outputs information in response to a reading signal received from another reader/writer, the receiver section 18 is capable of reading the information.

The operating section 19 has a ten-key numeric keypad and other operators, and outputs a signal in response to an operation by the user to the CPU 15. Reference numeral 20 designates a sound generating section. The sound generating section 20 generates sound under the control of the CPU 15. Further, reference numeral 30 designates a reader/writer. The reader/writer 30 is installed e.g. in a predetermined facility.

Next, the operation of the RFID tag-reading notification apparatus according to the first embodiment will be described with reference to FIGS. 4 and 5 as well as to FIGS. 1 to 3.

Figure 4:
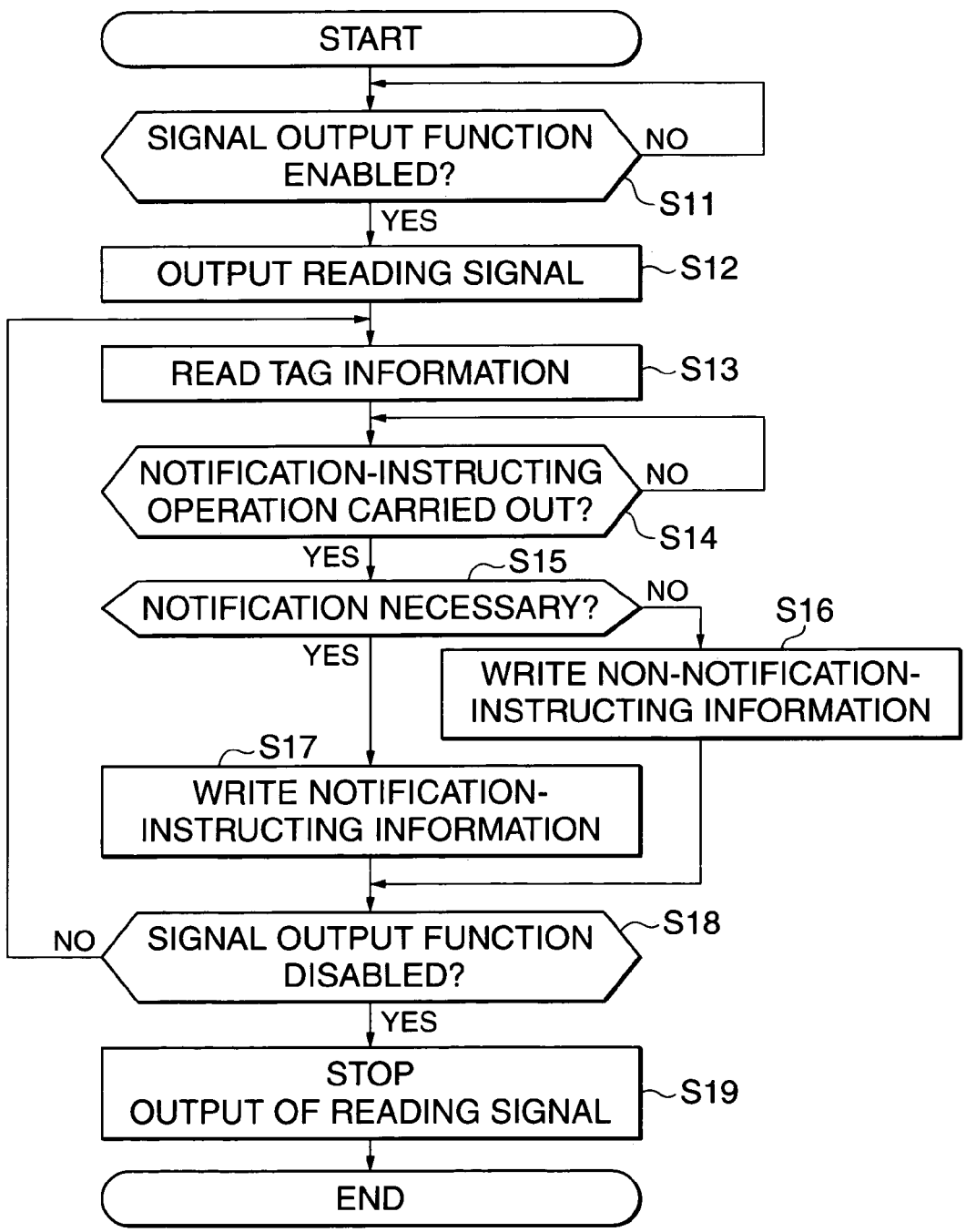
FIG. 4 is a flowchart of an information-writing process for writing tag information and notification-instructing information into the table shown in FIG. 3.

FIG. 4 is a flowchart of an information-writing process for writing tag information and notification-instructing information in the table TBL shown in FIG. 3. Further, FIG. 5 is a flowchart of a notification process for notifying the user of reading of information from an RFID tag.

When power generated by the receiver section 18 in response to radio waves received from an external device, such as a reader/writer, or power from an external power supply or a battery contained therein is supplied to the control section 11, execution of the information-writing process in FIG. 4 is started by the CPU 15.

In the information-writing process, first, it is determined whether or not the user has executed a key operation for enabling the reading signal output function of the receiver section 18 (step S11). If the answer to this question is affirmative (YES), the reading signal is output from the receiver section 18 under the control of the CPU 15 (step S12), so that the RFID tags 3a, 4a, 5a, and 6a attached to the shoes 3, wallet 4, passport 5, and vegetable 6, respectively, are sequentially read by the receiver section 18 (step S13). Specifically, the reading signal from the receiver section 18 is converted into power to activate the tags to transmit information contained in the tags to the receiver section 18.

The receiver section 18 transfers the received tag information to the CPU 15. The CPU 15 writes the tag information on the RFID tags 3a to 6a into a tag information storage area of the table TBL stored in the RAM 17.

After the tag information of each RFID tag is thus written into the table TBL, it is determined in a step S14 whether or not an operation concerning a notification instruction (notification instruction operation) has been carried out. The notification instruction indicates whether or not reading of the tag information from the RFID tag is to be notified to the user when the tag information is read by the reader/writer.

When the notification instruction operation has been carried out, if it indicates that reading of information from the RFID tag is to be notified (Yes to a step S15), information indicating that the notification is to be carried out is written into a notification instruction storage area of the table TBL (as shown by a mark "○" in FIG. 3) (step S17). On the other hand, if it indicates that reading of information from the RFID tag is not to be notified (No to the step S15), information indicating that the notification is not to be carried out is written into the notification instruction storage area of the table TBL (as shown by a mark "X" in FIG. 3) (step S16).

After the reading of the tag information of all the RFID tags has been carried out, if it is determined in a step S18 that a key operation for disabling the reading signal output function of the receiver section 18 has been carried out, the output of the reading signal from the receiver section 18 is stopped under the control of the CPU 15 (step S19).

Although in the above example, information on FID tags attached to articles is written into the table TBL, each tag may be affixed to the article after the tag information has been written in the notification apparatus 10. Further, if pieces of information stored in the RFID tags 3a to 6a are printed form and can be viewed, the user may input the tag information by operating the ten keys and the like of the operating section 19 while viewing the information, to write the information into the table TBL.

In the above described way, the tag information stored in the RFID tags 3a, 4a, 5a and 6a is input via the receiver section 18 or via the operating section 19 and written into the table TBL. FIG. 3 shows results of writing of the tag information. Whenever the tag information of each RFID tag is read, the user operates the operating section 19 to write into the table TBL the information indicating whether or not reading of the tag information of the RFID tag is to be notified when the tag information is read by the reader/writer. In the example of FIG. 3, it is set such that the notification is to be carried out in the case where the tag information of the RFID 4a and that of the RFID 5a is read.

It is assumed that the reader/writer 30 shown in FIG. 3 is owned by a malicious third party, and when the user carrying the suitcase 1 approaches the reader/writer 30 and enters the reading range of the same, the RFID tags 3a to 6a attached to the respective articles 3 to 6 contained in the suitcase 1 are supplied with power simultaneously, and the information stored in each of the RFID tags 3a to 6a is output. The information is received not only by the reader/writer 30 but also by the receiver section 18 of the notification apparatus 10.

Figure 5:
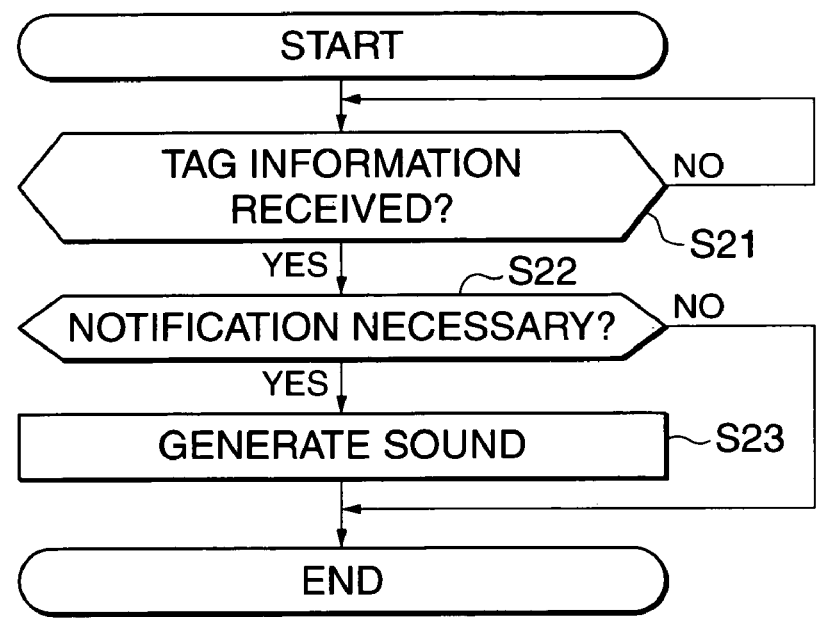
FIG. 5 is a flowchart of a notification process for notifying a user of information having been read from an RFID tag.

When the notification apparatus 10 is started, the CPU 15 starts execution of the notification process shown in FIG. 5.

In the notification process, the information read by the receiver section 18 is supplied to the CPU 15, and the CPU 15 determines in a step S21 in FIG. 5 that the tag information has been received. Then, the CPU 15 refers to the table TBL based on the received information, and determines whether or not to notify the user that the information has been or is going to be read (step S22). In the present example, since the contents of the table TBL indicates that the reading of information on the RFID tag 4a of the wallet 4 and that of information on the RFID tag 5a of the passport 5 is to be notified to the user (see FIG. 3), the CPU 15 instructs the sound generating section 20 to generate sound. This enables the user to be aware that information on some RFID tags attached to articles contained in the suitcase 1 has been or is going to be read.

If the notification apparatus 10 performs sounding in a place where an authorized reader/writer 30 is not supposed to be provided, the user can be on the alert by judging that there is a fear that tag information has been or is going to be read by an unauthorized reader/writer 30. In this case, the user can move away from the place. Further, if the reader/writer 30 can be detected, the user can negotiate with the owner of the reader/writer 30.

On the other hand, when the user carrying the suitcase 1 is passing e.g. through an airport gate where provision of the reader/writer is expected, and the suitcase 1 enters the reading range of the reader/writer, sound is output by the sound generating section 20 similarly to the above. In this case, however, from the situation that the user is passing through the airport gate, he/she can judge that the RFID information is being normally read by the reader/writer managed by the airport authorities, and thereby be aware that he/she need not be particularly on the alert.

In this way, the user can judge whether or not he/she is in a situation in which information is to be normally read from the RFID tags, so that when hearing the sound generated by the sound generating section 20, the user can determine whether or not to be on the alert.

Further, according to the first embodiment, the user can selectively configure settings in the table TBL as to whether or not notification of reading is to be carried out. Therefore, for example, when only numerous vegetables 6, to which are attached RFID tags the reading of information on which need not be notified, are contained in the container section 2, no notification is given even if the information is read by any reader/writer. In short, the table TBL can be set such that no notification is issued about information which is regarded as so low in required security level that the user need not monitor the reading thereof. This makes it possible to avoid the nuisance of being notified whenever information low in required security level is read by the reader/writer. Further, by providing the table TBL, it is possible to selectively configure settings on RFID tags stored in the container section 2 of the suitcase 1 as to whether or not the user is to be notified. Moreover, even if tag information stored in an RFID tag possessed by a person being present near the user is read by the notification apparatus 10, usually the read tag information cannot agree with the tag information stored in the table TBL, and hence the user is not notified of the fact. Therefore, the user can monitor only his/her own RFID tags. Moreover, since permission means is not provided in the RFID tags, the RFID tags can be made compact in size and low in cost.

Next, a description will be given of a second embodiment of the present invention.

Figure 6:
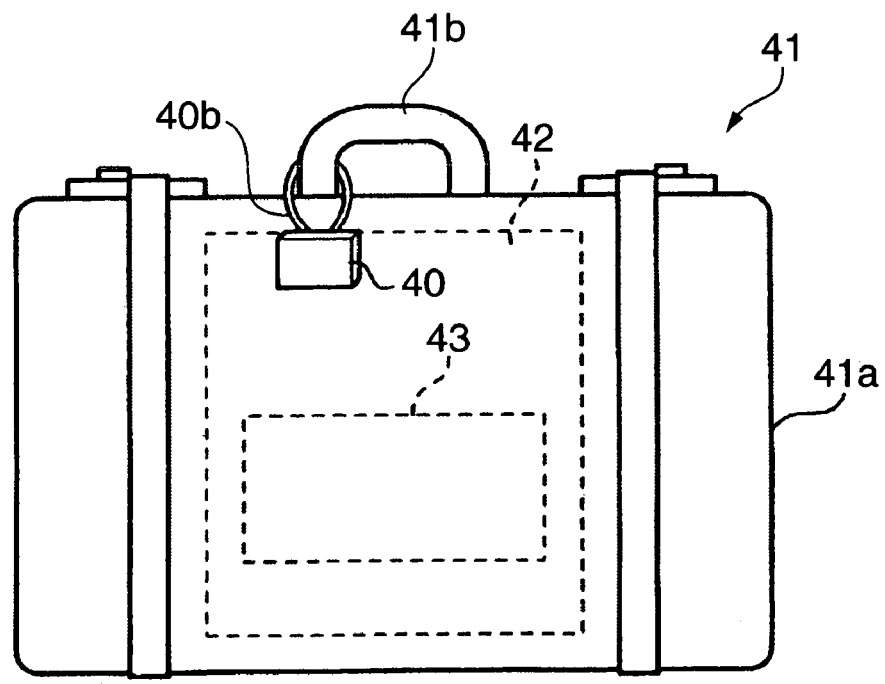
FIG. 6 is a schematic front view showing the appearance of a suitcase equipped with an RFID tag-reading notification apparatus according to a second embodiment of the present invention.

FIG. 6 is a schematic front view showing the appearance of a suitcase equipped with an RFID tag-reading notification apparatus according to the second embodiment. The suitcase 41 shown in FIG. 6 can be opened and closed, and carried by a user. The suitcase 41 has formed therein a container section 2 that can contain various articles. The container section 2 accommodates a magnetically shielded shield case 43. The shield case 43 is removable from the suitcase 41, and can be received in another container (such as a bag). Further, since the shield case 43 is magnetically shielded, it is impossible to use radio waves to access RFID tags contained in the shield case 43 from the outside. In FIG. 6, reference numerals 41a and 41b designate a suitcase body and a handle, respectively.

Figure 7:
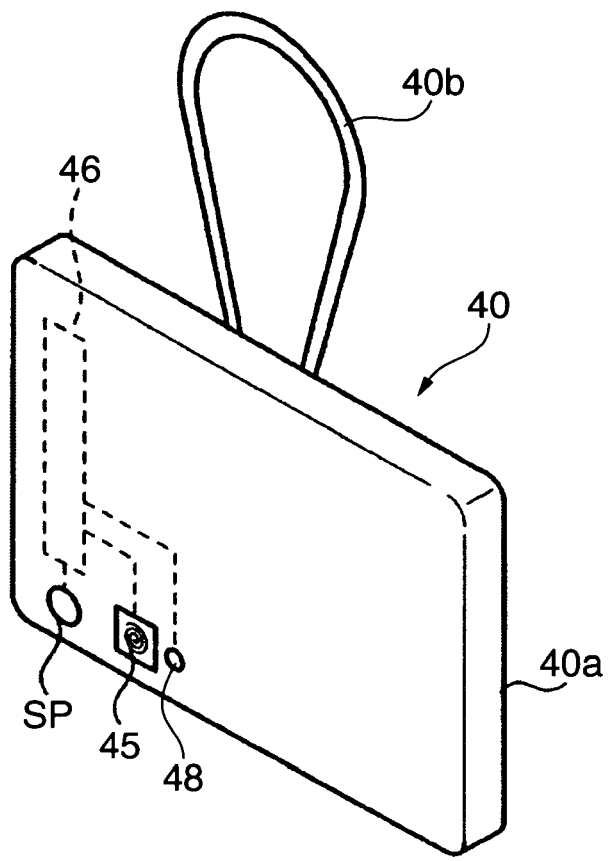
FIG. 7 is a schematic perspective view of the notification apparatus appearing in FIG. 6.

The notification apparatus 40, which is a key holder-type, is attached to the suitcase 41. FIG. 7 is a schematic perspective view showing the notification apparatus 40 according to the present embodiment. As shown in FIG. 7, the notification apparatus 40 is removable from the suitcase 41 similarly to a general key holder, so that the notification apparatus 40 can be detached from the suitcase 41 and attached to another article. In FIG. 7, reference numeral 40a designates a portable body of the notification apparatus 40, and reference numeral 40b a key holder-type mounting section for attaching the notification apparatus 40 to the suitcase 41.

In FIG. 7, reference numeral 45 designates an antenna section attached to the notification apparatus 40. The antenna section 45 receives a reading signal output from an RFID reader/writer. Further, a microspeaker SP is mounted in the body 40a in the vicinity of the antenna section 45. The antenna section 45 and the microspeaker SP are electrically connected to a notification circuit 46.

Figure 8:
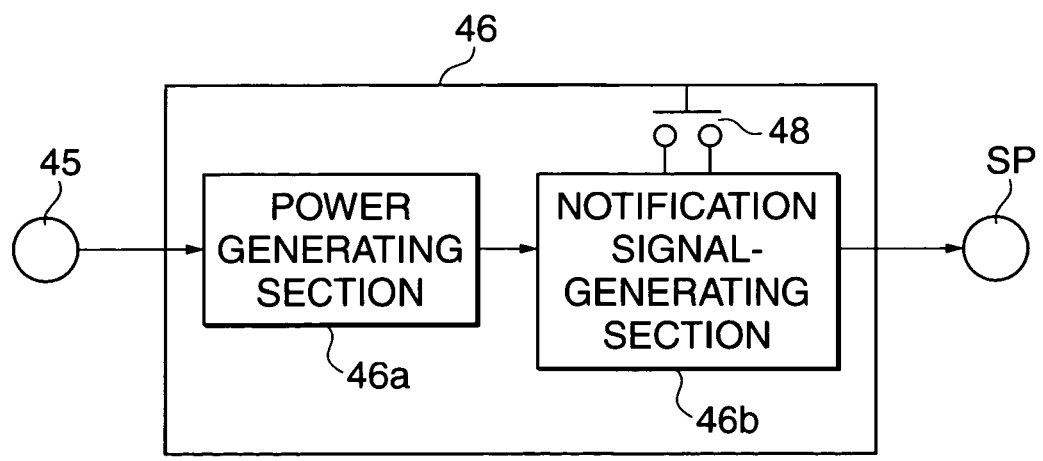
FIG. 8 is a block diagram showing the circuit configuration of a notification circuit of the notification apparatus.

The notification circuit 46 is configured as shown in FIG. 8. Reference numeral 46*a* in FIG. 8 designates a power generating section that generates and outputs a power generation-detecting signal when receiving an electromotive force generated by excitation of the antenna section 45 having received the reading signal. Upon receiving the power generation-detecting signal from the power generating section 46*a*, a notification signal-generating section 46*b* generates a notification signal for causing the microspeaker SP to sound. When the notification apparatus 40 constructed as above enters the reading range of a reader/writer to receive a reading signal therefrom, a notification sound is output from the microspeaker SP.

Next, a description will be given of the operation of the notification apparatus 40 according to the second embodiment. First, the user puts RFID tags themselves or articles with RFID tags attached thereto in the shield case 43 within the suitcase 41. If the user goes to a place with the suitcase 41, where a reader/writer is provided, when the suitcase 41 enters the reading range of the reader/writer, the antenna section 45 receives a reading signal from the reader/writer. As a result, the power generating section 46*a* generates the power generation-detecting signal, and the notification signal-generating section 46*b* generates the notification signal, so that the microspeaker SP generates the notification sound.

This makes the user aware of the presence of the reader/writer around him/her. When the user is near a check-out counter in a supermarket, a ticket gate in a railroad station, or a gate in an airport, for example, the user can judge that he/she is in a situation where the RFID tags are normally read. In this case, the user takes out an associated RFID tag or an article with an associated RFID tag from the shield case 43, and allows the reader/writer to read the RFID tag information. If an associated RFID tag or an article with an associated RFID tag is stored in the suitcase 41 and placed outside the shield case 43, the user can allow the reader/writer to read the RFID tag information without taking out the RFID tag or article with an associated RFID tag from the suitcase 41.

Even when the notification sound is output from the microspeaker SP, if the user judges that he/she is in a place improper for allowing RFID tag information to be read, the user does not take out the associated RFID tag or article from the shield case 43, to thereby prevents unauthorized reading of the tag information.

As described above, according to the present embodiment, RFID tags within the shield case 43 are not yet read at the time the notification sound is output, so that it is possible to prevent important personal information or the like from being read. Meanwhile, in a situation where RFID tag information needs to be read, the user has only to take out the associated RFID tag or article from the shield case 43.

It should be noted that the notification signal-generating section 46*b* may be provided with a switch 48 for stopping the output of the notification sound. With this configuration, the output of the notification sound can be stopped simply by pressing the switch 48 earliest possible after recognition of the sound.

Although in the above described embodiment, the shield case 43 is small in size enough to be easily accommodated in the suitcase 41, this is not limitative, but the shield case 43 may be larger in size so as to accommodate a larger article. Alternatively, the shield case 43 may have a small size which allows storage of RFID tags alone or card-like RFID tags molded e.g. in a thin plate-like resin. Further, it is possible to use a container formed of a suitcase 41 and a shield case 43 which are formed in one body.

Furthermore, if the antenna section 45 has a higher radio-wave reception sensitivity than that of the RFID tags, even when the RFID tags are placed outside the shield case 43 within the suitcase 41, the presence of an RFID reader/writer can be detected before information is read from the RFID tags.

Although in the above described embodiment, the antenna section 45 for receiving a reading signal output from an RFID reader/writer is provided in the notification apparatus 40, alternatively, a dummy RFID tag may be provided in a non-shielded state in the notification apparatus 40 so as to receive the reading signal from an RFID reader/writer in place of the antenna section 45.

The present invention is not limited to the above described embodiments, and can be practiced in various forms.

If it is desired in the first embodiment that a notification is to be issued for all of the RFID tags contained in the container section 2 when information on them is to be or has been read, the table TBL may be omitted. In this case, when information on the reading is supplied from the receiver section 18, the CPU 15 may cause the sound generating section 20 to output the notification sound.

Although the table TBL in the first embodiment stores the pieces of RFID tag information and the respective associated pieces of notification-instructing information in pairs, the notification-instructing information may be omitted. Alternatively, when reading information read by the receiver section 18 agrees with at least one of the pieces of RFID tag information registered in the table TBL, notification may be carried out. In this case, even when information is read from any RFID tag by an RFID reader, notification is not carried out unless the RFID tag is already registered in the table TBL.

On the other hand, in the case where the table TBL stores the notification-instructing information, notification is carried out only when the reading information read by the receiver section 18 agrees with one of the pieces of RFID tag information registered in the table TBL, and at the same time, when it is indicated by the associated notification-instructing information that notification is to be carried out.

Further, the notification sound may be generated using a simple waveform or alternatively a complicated waveform such as a melody or the like. Furthermore, different kinds of sound may be used for the respective RFID tags. This enables the user to determine, simply by hearing a notification sound, whether or not the RFID tag for which the sound is generated has a security to which the user should be alert. To vary the sounding mode every RFID tag, for example, information on a sounding mode to be used may be written in advance in the table TBL in association with each RFID tag, and the CPU 15 may refer to the table TBL to instruct the sound generating section 20 to generate sound in the associated sounding mode.

Although in the above described embodiments, notification is carried out using sound, this is not limitative, but light from an LED or the like or vibration from a vibrator may be used. In other words, any alarm means may be used insofar as it can make the user aware that an RFID tag has been (or is going to be) read.

Further, the alarm means may be provided separately from the body 10*a* of the notification apparatus 10. For example, an incoming call tone of a cellular phone or a vibrator thereof may be used as an alarm means. In this case, radio waves (such as Bluetooth) may be used to output a notification signal. The cellular phone used for this purpose is configured such that an incoming call tone is sounded or the vibrator is driven when the notification signal is received.

Although in the above described second embodiment, the reading signal from a reader/writer is detected to generate a notification sound, alternatively, a dummy RFID tag, information on which can be read, may be exposed in a non-shielded state, and information transmitted when the tag information of the dummy RFID tag is read is detected to output a notification sound.

Although the notification apparatus 10 or 40 in the above described first or second embodiment is a key holder type, this is not limitative, but the notification apparatus may have a different form and a different shape from the key holder type. For example, a strap-type notification apparatus 50 shown in FIG. 9, which can be attached to a bag or a cellular phone, or a key holder-type notification apparatus 51 shown in FIG. 10, may be used.

Further, as shown in FIGS. 11 and 12, a notification and/or a detecting means can be provided in a proper portion of a finger ring 52 or a watch 53 usually worn by a user. Alternatively, as shown in FIGS. 13 and 14, a notification apparatus body may be provided in a lucky charm 54 which can be put in a bag, a wallet, a pocket, or any appropriate arbitrary place, or in a mascot 55.

Figure 15:
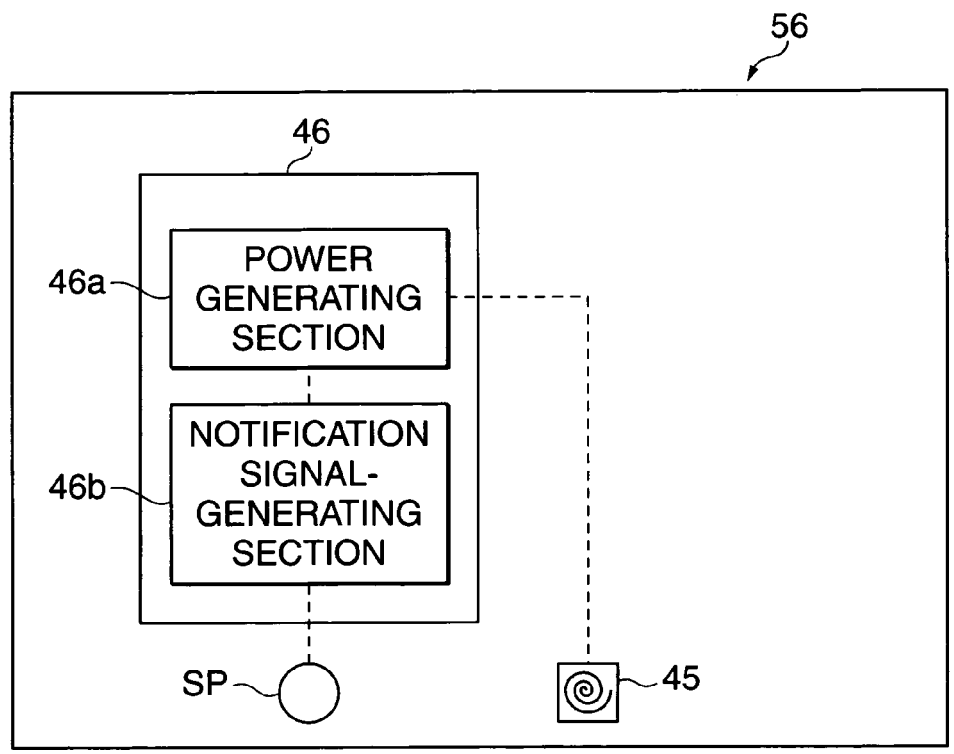
FIG. 15 is a block diagram showing the arrangement of a tape-like notification apparatus according to a variation of the present invention.
Figure 16:
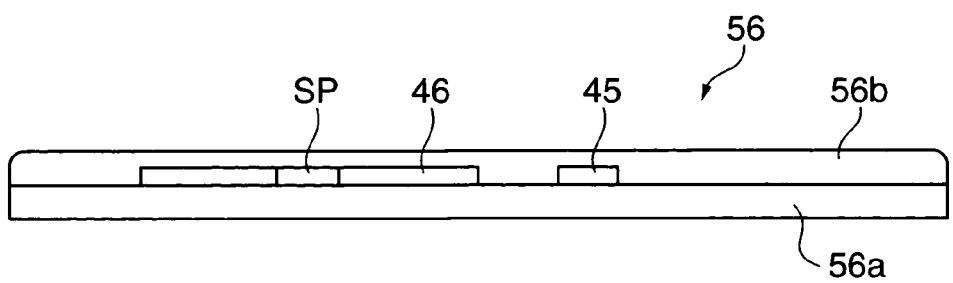
FIG. 16 is a schematic side view of the tape-like notification apparatus shown in FIG. 15.

As shown in FIGS. 15 and 16, the notification apparatus may have a flexible tape-like form which can be affixed to an article. The tape-like notification apparatus 56 shown in FIGS. 15 and 16 has an adhesive sheet 56a coated with an adhesive so as to affix the notification apparatus 56 to an article. On the upper surface of the adhesive sheet 56a, there is provided a soft substrate 56b formed of a thin plate-shaped resin. The antenna section 45, the microspeaker SP, and the notification circuit 46 are provided within the substrate 56b, and the surfaces of these components are protected by the substrate 56b. The arrangement and operation of the antenna section 45, the microspeaker SP, and the notification circuit 46 are similar to those of the notification apparatus 40 shown in FIGS. 6 to 8, and therefore description thereof is omitted.

Figure 17:
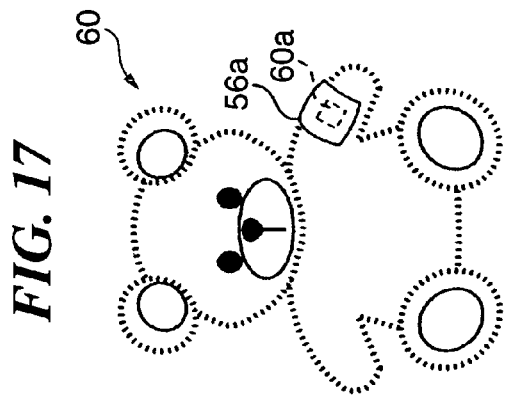
FIG. 17 is a schematic view showing a state in which the notification apparatus shown in FIGS. 15 and 16 is affixed to a mascot.

As shown in FIG. 17, the notification apparatus 56 can be affixed to an article 60 by the adhesive sheet 56a in a manner covering an RFID tag 60a attached to the article 60, such as a mascot.

It should be noted that a magnetically shielded shield sheet may be interposed between the adhesive sheet 56a and the substrate 56b. In this case, since the notification apparatus 56 is affixed to the article 60 in a manner covering the RFID tag 60a on the article 60 as shown in FIG. 17, access to the RFID tag 60a from the outside by radio waves is inhibited, which makes it possible to prevent unauthorized reading of tag information from the RFID tag 60a. On the other hand, in authorized tag reading, the notification apparatus 56 is peeled off the article 60, and then the information is read from the RFID tag 60a by an RFID reader. The notification apparatus 56 can be affixed again to the article 60 after the tag reading is completed.

It should be noted that the notification apparatus 56 may be provided with a mating surface fastener (fastener comprised of a pair of a cloth having one surface formed thereon with hook-like projections and a pile-like surface) in place of the adhesive sheet so as to be attached to an article. In short, any means may be used insofar as it can allow the notification apparatus to be affixed to an article.

Figure 19:
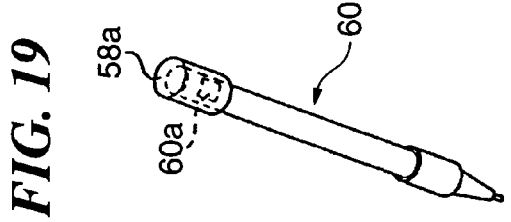
FIG. 19 is a schematic perspective view of a cap-like notification apparatus according to another variation of the present invention.
Figure 18:
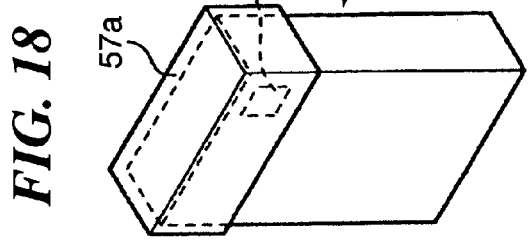
FIG. 18 is a schematic perspective view of a cap-like notification apparatus according to another variation of the present invention.
Figure 21:
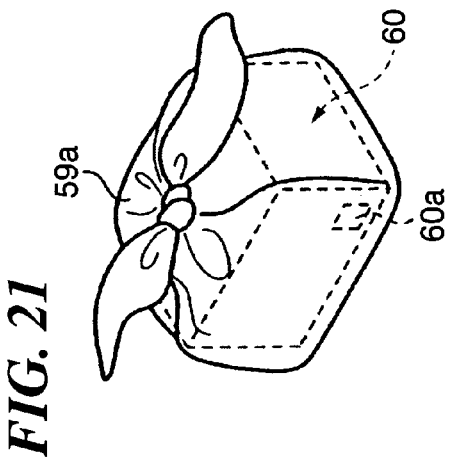
FIG. 21 is a schematic perspective view showing a state in which an article is wrapped in the wrapping cloth-type notification apparatus shown in FIG. 20.
Figure 20:
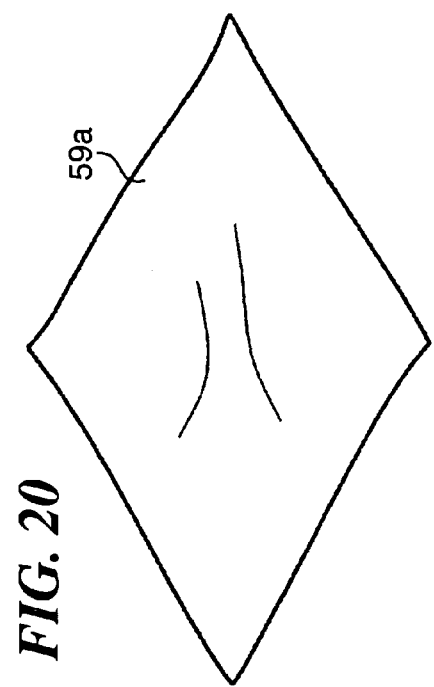
FIG. 20 is a view of a wrapping cloth-type notification apparatus according to another variation of the present invention.

Further, the notification apparatus body may be in the form of a cap for covering a portion of an article 60, as shown by reference numerals 57a and 58a in FIGS. 18 and 19, instead of the form of a sheet. Alternatively, as shown by reference numeral 59a in FIGS. 20 and 21, the notification apparatus body may be a wrapping cloth type formed of cloth or the like and be capable of wrapping an article 60.

Furthermore, an electrically shielded shield sheet may be provided within each of the notification apparatus bodies 57a to 59a so as to block external radio waves from accessing the RFID tag 60a on the associated article 60. Thus, unauthorized reading of the tag information from the RFID tag 60a can be prevented. On the other hand, in authorized tag reading, the notification apparatus body 57a or 58a is removed from the article 60, or the notification apparatus body 59a is unwrapped, and then the information is read from the RFID tag 60a.

It should be noted that similarly to the notification apparatus 56 shown in FIGS. 15 to 17, a notification apparatus can be formed by providing the antenna section 45, the microspeaker SP, and the notification circuit 46 shown in FIGS. 15 and 16 in each of the notification apparatus bodies 57a to 59a shown in FIGS. 18 to 21. Also in this case, the alarm means (microspeaker SP) may be separately provided. For example, an incoming call tone of a cellular phone or a vibrator thereof may be used as the notification apparatus.

Further, each of the notification apparatuses shown in FIGS. 15 to 21 may be provided with a table storing RFID tag information and/or notification-instructing information so that notification can be carried out based on the information stored in the table.

The present invention is not limited to the above described embodiments and variations (hereinafter collectively referred to as embodiments), but can be modified in various manners based on the subject matter of the present invention, which should not be excluded from within the scope of the present invention insofar as functions as recited in the appended claims or the functions performed by the construction of each of the above described embodiments can be achieved. Further, the present invention may either be applied to a system composed of a plurality of apparatuses or to a single apparatus.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An RFID tag-reading notification apparatus comprising:
    a receiving device that receives a signal transmitted from at least one predetermined RFID tag having received radio waves from an RFID reader;
    an operating device operated by a user for inputting notification instructing information indicative of whether or not a notification signal indicative of reading information from the at least one predetermined RFID tag by the RFID reader is to be output;
    a storage device that stores information stored in the predetermined RFID tag and the notification instructing information input through the operating device; and
    a notification signal-outputting device that is operable when information contained in the signal received by said receiving device corresponds with the information stored in said storage device and the notification instructing information indicates that the notification signal is to be output, to output the notification signal, and otherwise, not to output the notification signal.

2. An RFID tag-reading notification apparatus as claimed in claim 1, further including an alarm device that performs at least one of sound generation, light emission, or vibration based on the notification signal output from said notification signal-outputting device.

3. An RFID tag-reading notification apparatus as claimed in claim 2, wherein:
    said receiving device, said storage device, said notification signal-outputting device, and said alarm device are accommodated in a portable case; and
    said case is removably attached to an article or a human body by an attaching means.

4. An RFID tag-reading notification apparatus as claimed in claim 1, including a flexible sheet having a surface that is attachable to an article, and wherein said receiving device and said notification signal-outputting device are attached to said flexible sheet.

5. A control method for an RFID tag-reading notification apparatus having a receiving device that receives a signal transmitted from at least one predetermined RFID tag having received radio waves from an RFID reader, an operating section, operated by a user, through which notification instructing information indicative of whether or not a notification signal indicative reading of information from the predetermined RFID tag by the RFID reader is inputted, and a storage device that stores information stored in the predetermined RFID tag, and the notification instructing information, input from the operating section, indicative of whether or not the notification signal indicative reading of the information from the predetermined RFID tag is to be output, the method comprising:
    determining whether or not information contained in the signal received by said receiving device corresponds with the information stored in said storage device and the notification instructing information indicates that the notification signal is to be output; and
    outputting the notification signal indicative of reading of the information from the predetermined RFID tag by the RFID reader, and otherwise, not to output the notification signal when it is determined that the information contained in the signal received by said receiving device corresponds with the information stored in said storage device and the notification instructing information indicates that the notification signal is to be output.

6. A storage medium having encoded thereon a program including instructions for causing a computer to execute a control method for an RFID tag-reading notification apparatus having a receiving device that receives a signal transmitted from at least one predetermined RFID tag having received radio waves from an RFID reader, an operating section, operated by a user, through which notification instructing information indicative of whether or not a notification signal indicative reading of information from the predetermined RFID tag by the RFID reader is inputted, and a storage device that stores information stored in the predetermined RFID tag, and the notification instructing information, input from the operating section, indicative of whether or not the notification signal indicative reading of the information from the predetermined RFID tag is to be output, the control method comprising:
    determining whether or not information contained in the signal received by said receiving device corresponds with the information stored in said storage device and the notification instructing information indicates that the notification signal is to be output; and
    outputting the notification signal indicative of reading of the information from the predetermined RFID tag by the RFID reader, and otherwise, not to output the notification signal when it is determined that the information contained in the signal received by said receiving device corresponds with the information stored in said storage device and the notification instructing information indicates that the notification signal is to be output.

* * * * *